April 21, 1953  B. T. HENSGEN ET AL  2,635,965
PACKAGING OF PRODUCTS IN SLAB FORM
Filed Jan. 27, 1950  6 Sheets-Sheet 1
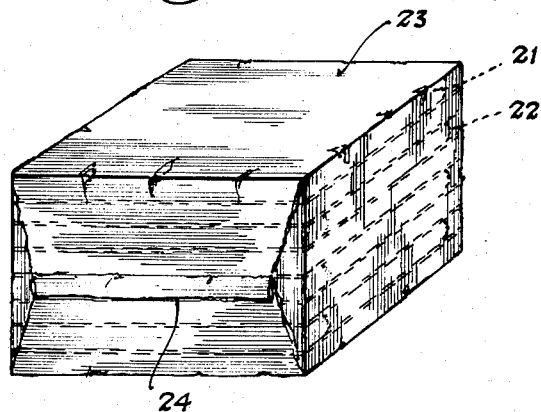
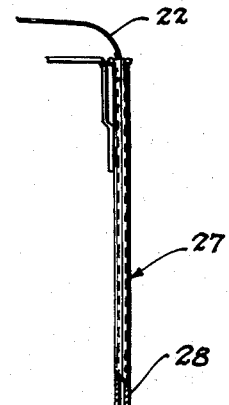
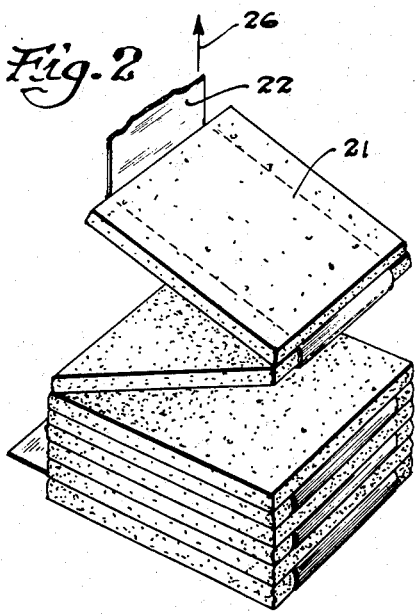
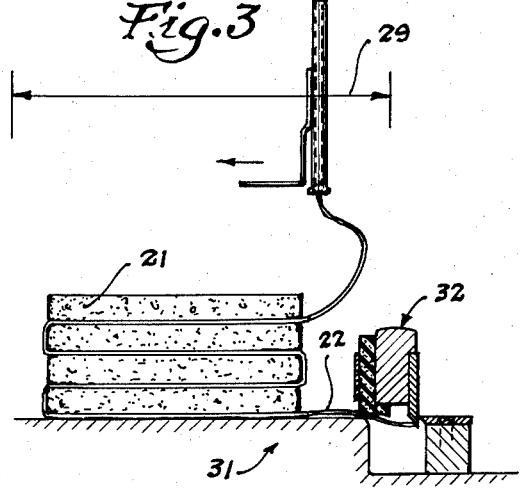
Bernard T. Hensgen
Johan C. Vanden Bosch
INVENTORS
BY R. G. Story
ATTORNEY

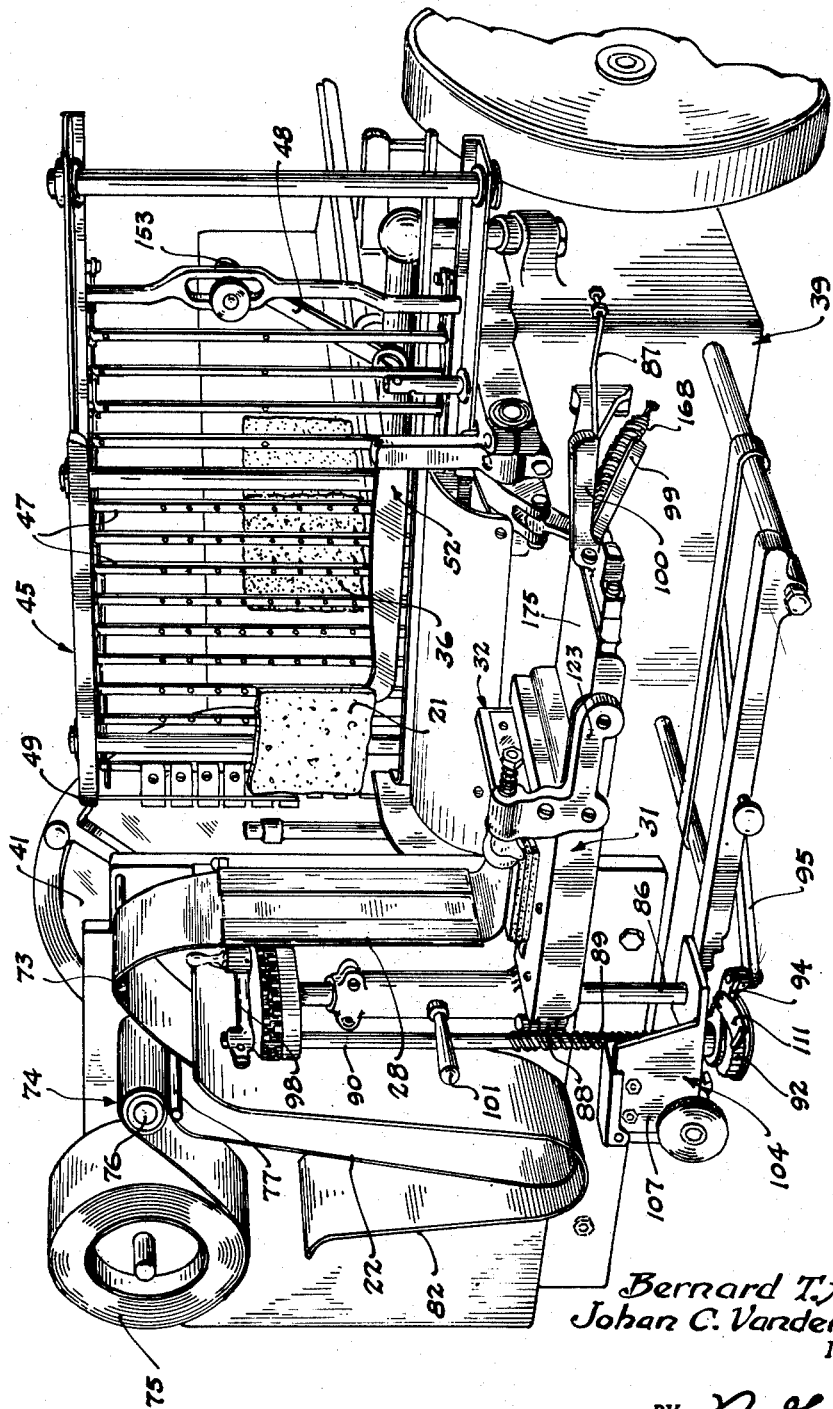

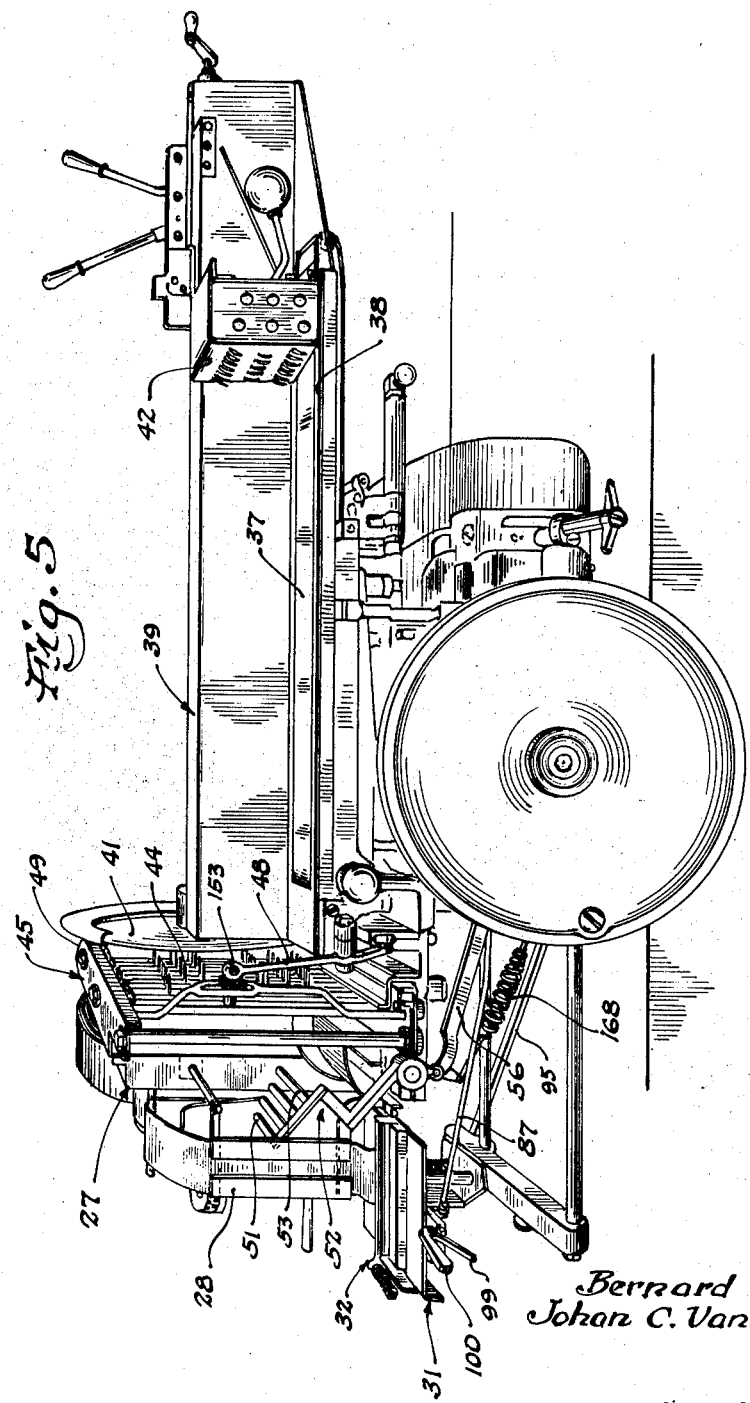

April 21, 1953    B. T. HENSGEN ET AL    2,635,965
PACKAGING OF PRODUCTS IN SLAB FORM
Filed Jan. 27, 1950    6 Sheets-Sheet 4

Bernard T. Hensgen
Johan C. Vanden Bosch
INVENTORS

BY R. G. Story
ATTORNEY

April 21, 1953 B. T. HENSGEN ET AL 2,635,965
PACKAGING OF PRODUCTS IN SLAB FORM
Filed Jan. 27, 1950 6 Sheets-Sheet 5

Bernard T. Hensgen
Johan C. Vander Bosch
INVENTORS

BY R. G. Story
ATTORNEY

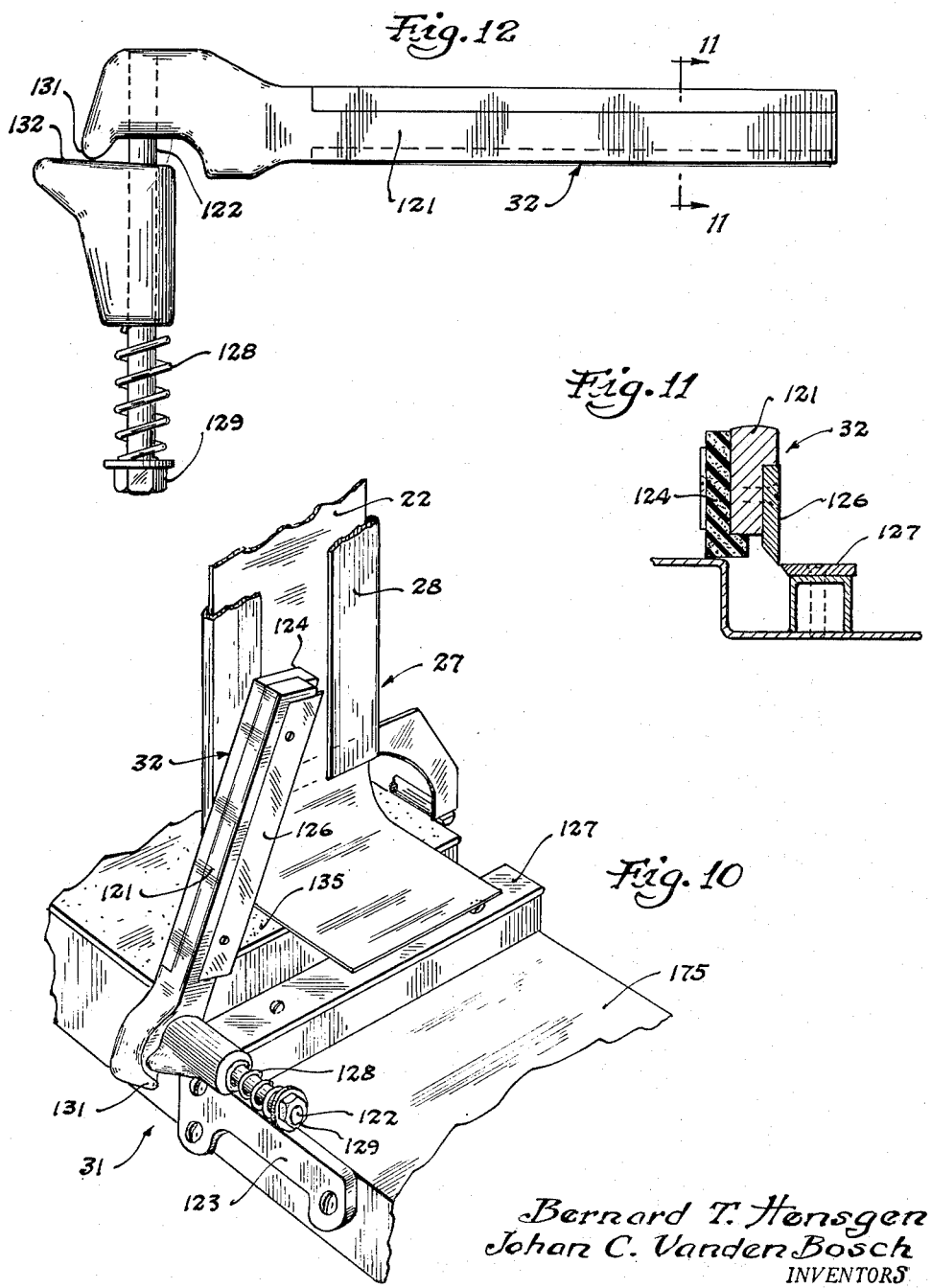

Patented Apr. 21, 1953

2,635,965

UNITED STATES PATENT OFFICE 2,635,965

PACKAGING OF PRODUCTS IN SLAB FORM

Bernard T. Hensgen and Johan C. Vanden Bosch, Chicago, Ill., assignors to Swift & Company, Chicago, Ill., a corporation of Illinois Application January 27, 1950, Serial No. 140,932

16 Claims. (Cl. 99—171)

1

The present invention relates to the packaging, or preparation for packaging, of slices of a material, such as cheese, by winding a continuous strip of a divider material between the slices to overcome the tendency of the slices to adhere or coalesce, and includes apparatus for interleaving the slices with portions of said strip.

When slices of cheese are placed together for a period of time, they cohere to such an extent that it would almost seem as though they had not been sliced. The same thing will happen to many other materials to a greater or lesser extent. Because of this phenomenon, it is impractical to slice these materials much before the time they will be used.

The principal object of the present invention is to overcome this problem by winding a continuous strip of a divider material through a stack of such slices to place the faces of the slices out of contact with each other. A number of advantages are achieved by the employment of our invention. It is not necessary for the small retailer or consumer to maintain a slicer or to undertake the burden of doing the slicing, but this may be done by the producer of the product who can handle the job efficiently by large scale production methods. The individual slices may be readily separated from a stack thereof by pulling upwardly on the strip, thereby lifting the top slice away from the remainder and then detaching the strip from thereby displaced slice.

To achieve this end we have devised a novel apparatus for continuously winding the strip of divider material between the slices as fast as they are cut from the block of cheese or the like. Some of the advantages of this apparatus include: the ability to employ the interleaver as an integral part of a slicer with only minor modifications of a standard slicing machine; and the simplicity, which is such that the average unskilled worker can become proficient in the operation of the machine in a very short time with only a minor amount of instruction, which enables the device to be nominal in initial cost, and which insures that little maintenance will be required.

A further object is found in the ability of the present invention to turn out a desired quantity of sliced product in a neat stack, through which stack a paper strip has been woven and which is ready to be placed in a transparent wrapper to form an attractive consumer package.

Additional objects and advantages will become apparent from the following description taken in conjunction with the drawings, in which:

Fig. 1 is a perspective view of a package of cheese produced in accordance with the concepts of the present invention;

Fig. 2 is a perspective view of a stack of slices of cheese through which has been wound a strip

Figure 6:
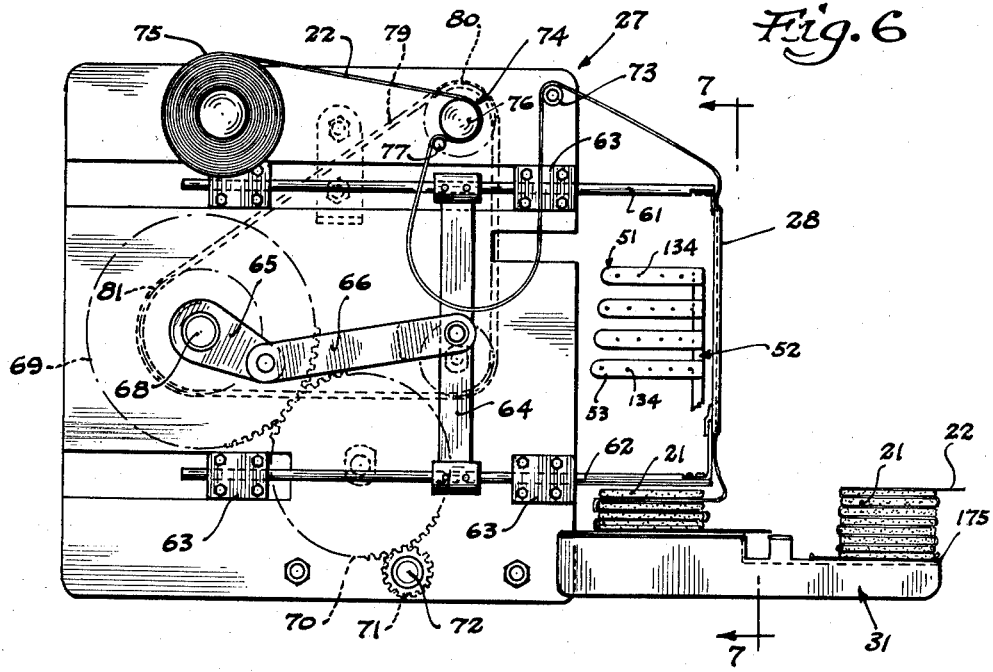
Figure 7:
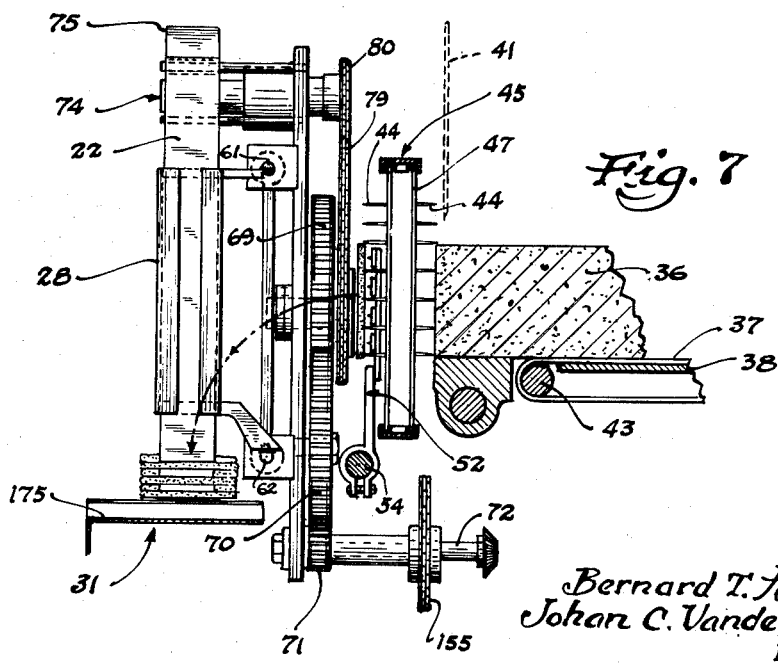
Figure 8:
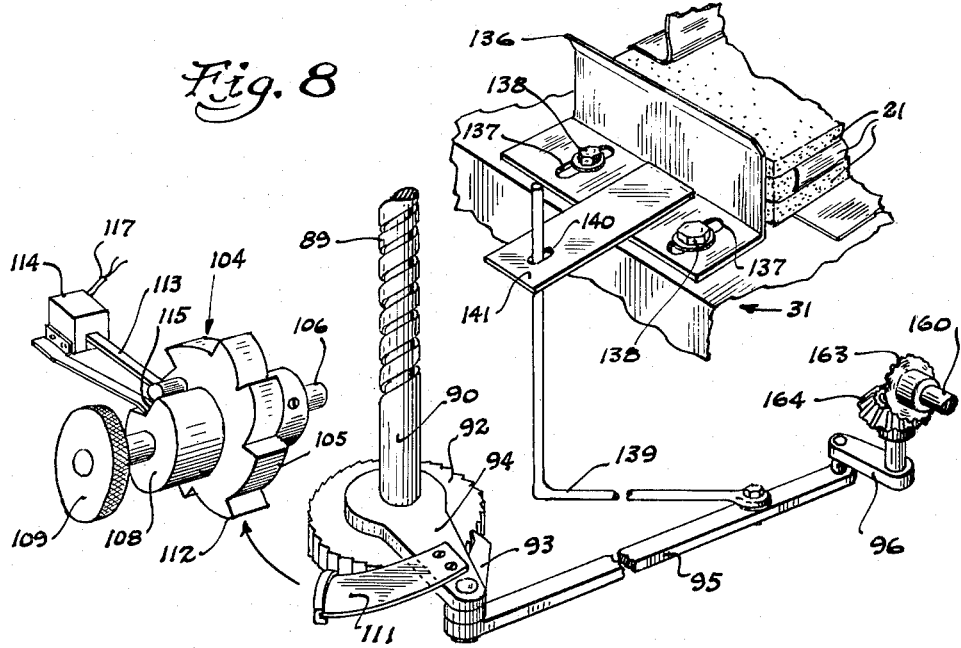
Figure 9:
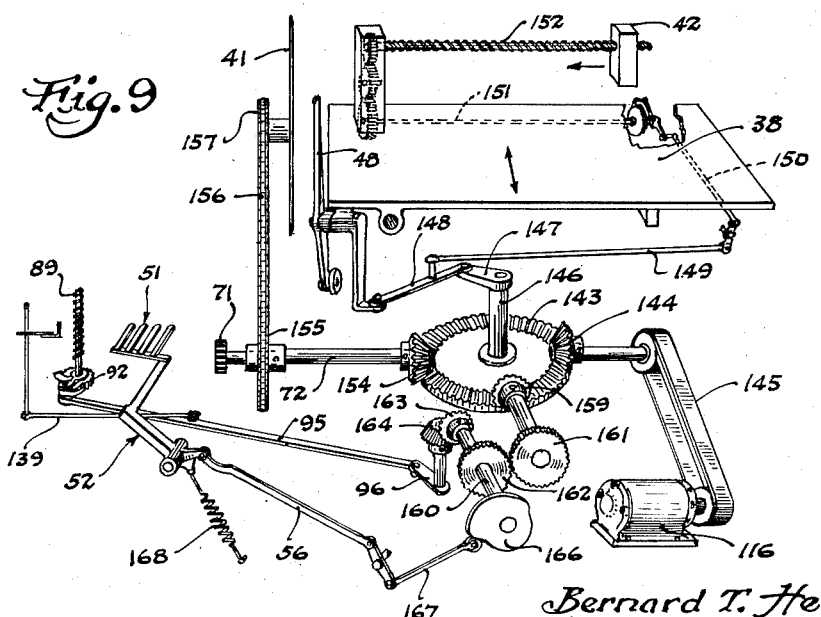

2 of a divider material and illustrates how the cheese may be readily separated by lifting up on the strip of material;

Fig. 3 is an elevational view illustrating the principle of operation of the interleaver of the present invention;

Fig. 4 is a perspective view of one end of a slicing machine incorporating an interleaver for winding divider material between the slices as they are produced;

Fig. 5 is a perspective view of the front of the machine of Fig. 4;

Fig. 6 is an end elevation of the interleaver illustrated in Fig. 4 with the cover plate removed to illustrate the operation of the interleaver;

Fig. 7 is a front elevation of the interleaver of Fig. 6 together with the feed and stacking means for the slices of cheese;

Fig. 8 is a diagrammatic view of the means for lowering the sliced cheese table and for shutting off the apparatus when a predetermined number of slices have been deposited on said table, and further illustrates the structure for incorporating a jogger to even up the edges of the slices on said table;

Fig. 9 is a diagrammatic view of the power drive mechanism for the various portions of the machine of Fig. 4;

Fig. 10 is a perspective view of a portion of the sliced cheese receiving table showing the divider material cut-off and clamp;

Fig. 11 is a section of a portion of the table and clamp of Fig. 10 illustrating the action of the divider material cut-off and clamp; and Fig. 12 is a plan view of the cut-off and clamp of Fig. 10.

The following description of a specific embodiment is for the purpose of complying with Section 4888 of the Revised Statutes and should not be interpreted as placing any unnecessary limitations upon the appended claims. Various modifications of the apparatus specifically described will be apparent to those skilled in the art. While the description is particularly directed to and discusses the advantages of the present invention in the preparation of packages of sliced cheese, it will be readily apparent that it is applicable in many other fields where it may be desirable to place a strip of divider material between adjacent slabs of a given product. The slabs do not necessarily have to be produced as slices but may be a result of an extrusion, a punching, or other processes to fit the particular circumstances.

Product

A great demand exists for prepackaged products which are attractively displayed and protected by a tight wrapper. The self-service stores particularly are continually pressing the distributors and producers for food products which have been so packaged in order to increase the consumer acceptance of their products. The less additional processing required on the part of the consumer before a particular brand of a product is ready for use, the greater is the selling power.

Fig. 1 illustrates a package of slices of cheese produced by the teachings of the present invention. The individual slices of cheese 21 are neatly cut and stacked, with a continuous strip of divider material 22 separating each of the slices. The number of slices and total weight of the package may be varied to suit the producer. In the illustrated embodiment eight slices, totaling one-half of a pound in weight, are produced to make up each package and an attractive transparent wrapper 23 encloses the eight slices with the edges of the wrapper being sealed as illustrated at 24. The wrapping material, of course, may be varied to suit the circumstances of the case. It may be a film of cellophane, polyethylene, or other material which is transparent and suited to the packaging of the particular product involved. The joints may be suitably glued, heat-sealed, or otherwise joined.

As illustrated in Fig. 2, the consumer upon opening the outer wrapper 23 is required only to lift upwardly, as indicated by arrow 26, on the strip of divider material 22 to separate the uppermost slices from the remaining stack. The separated slices 21 are then easily stripped from the divider material 22. The width of the divider material 22 may be varied to suit the requirements of the particular product. With cheese it has been found to be desirable to make the width of the divider material, a strip of 15# pure vegetable parchment paper, substantially equal to the width of the slices of cheese.

*Principle of operation*

The principle of operation of the interleaver, used to wind the strip through the stack of slabs, is illustrated in Fig. 3. A portion of the interleaver, generally 27, forms a guide 28 for the strip of divider material 22. The interleaver moves the guide along a path 29 for a distance slightly greater than the dimension of the slabs about which the divider material is to be wound. The slices or slabs 21 are deposited upon a suitable table means, generally 31, by a stacking means, not shown in Fig. 3.

The stacking means move each slab individually along a line substantially normal to the path 29 of the interleaver guide (the general direction of which line would be either toward or away from the observer in Fig. 5). The movements of the stacking means and the interleaver guide are in timed relationship with each other so that after each slice 21 is deposited upon table means 31 by the stacking means, the interleaver guide moves across the top of said slice depositing a portion of the strip of divider material 22 on top of that slice.

For example, before any slices are deposited on table 31 in Fig. 5, the end of the divider material 22 was held in place by means of a clamp, generally 32 (the operation of which will be subsequently described in more detail). At this time guide 28 was at the left hand end of its path 29 and the stacking means moved the first slice 21 into place and deposited it on the portion of strip 22 covering table means 31. After the stacking means had moved back out of the way, or at least was clear of the space through which the guide must move, guide 28 moved to the right hand end of path 29 and remained there while the stacking means deposited the second slice 21 upon the portion of the divider strip 22 overlying the bottom slice 21. Whereupon the guide is returned to the left hand end of path 29 depositing a further portion of divider material 22 upon the second slice. The series of steps is repeated for as many slices as may be desired in a given stack.

*Slicer*

Figs. 4 and 5 illustrate an embodiment of the present invention. A block 36 of cheese, or the like, is placed upon the portion of a moving belt 37 overlying the top of table 38 of a slicer, generally 39. The table 38 reciprocates toward and away from a rotary knife 41 to cut slices from the end of block 36. After each slice has been cut from the end of the block 36 an indexing means moves pusher 42 a given distance forward (to the left in Fig. 5) so as to advance the block of cheese 36 sufficiently for the next slice to be removed by knife 41 upon the subsequent reciprocation of table 38.

Belt 37 is mounted on a pair of rolls 43 and between the rolls the upper run of the belt overlies the upper surface of table 38 as illustrated in Fig. 7. The belt 37 is attached to pusher 42. Thus, with each indexing movement of pusher 42 there is a simultaneous movement of the endless belt 37.

The use of the belt in conjunction with the pusher enables the slicer to produce even slices, each containing a given quantity of material. Without the use of the belt 37 sufficient adhesion develops between the cheese 36 and the top of table 38 to cause the pusher 42 to actually compress the block of cheese with the result that at times the cheese does not move forward to the extent desired and thinner slices are produced.

At other times the compression may build up sufficiently so as to cause the cheese to suddenly release from its grip with the table with the result that that slice will be unusually thick as compared to the other slices. Through the use of the belt, the cheese is moved a given distance with each indexing movement of pusher 42 to produce uniform slices.

*Feed and stacking means*

As the block of cheese moves to the left with each indexing movement of pusher 42, the end of the block is impaled upon a series of pins 44 of a feed means, generally 45 (see particularly Fig. 7). Pins 44 are carried on a series of interconnected slats 47 which slats travel in a track formed by the top and bottom plates of feed means 45. The movement of the slats is controlled by a crank 48 connected to the end slat, which slat is somewhat heavier in structure than the remainder.

As table 38 moves backwardly toward knife 41 to cut a slice from the end of block 36, crank 48 moves the slats 47 rearwardly at the same rate of speed. During this movement knife 41 cuts off the end of block 36 forming a slice 21, which slice remains impaled upon pins 44. The movement of the slats 47 continues around the curved rearwardly end 49 of feed means 45 and continues in a forwardly direction towards the lay-down paddle 51 of stacking means, generally 52.

Paddle 51 of the stacking means has a plurality of projecting fingers 53 spaced to receive pins 44, as illustrated in Fig. 7. Paddle 51 is pivotally mounted about shaft 54 and at the time that a slice 21 is being cut from the end of the block 36 and is being moved by the feed means 45 toward the paddle, the paddle is positioned upwardly so that pins 44 will move between fingers 53, the fingers being between slats 47 and the impaled slice of cheese 21.

While the slats remain in this position, the paddle 51 is rotated counter-clockwise (away from the slats) about shaft 54 by means of a crank 56 (Fig. 5), thus taking the slice of cheese 21 from the pins 44 and carrying the slice with it to deposit the slice on the top of table means 31. While the stacking means 52 is delivering the slice to the table, pins 44 of feed means 45 return to the knife side of the feed means to receive a second slice of cheese as it is cut from the block 36.

Interleaver

Guide 28 of the interleaver 27 is mounted at the end of a pair of arms 61 and 62 (best seen in Fig. 6). Each of the arms is mounted for a longitudinal movement in a pair of bearings 63. A cross rod 64 between arms 61 and 62 is attached to crank 65 by a connecting rod 66. The crank 65 is mounted on a shaft 68, which shaft is driven through a train of gears 69, 70, and 71. Driving gear 71 is connected through a shaft 72 to the drive for the slicer 39, the feed means 45, and the stacking means 52 so that as each slice 21 is deposited upon table 31 by the stacking means 52, the crank 65 will be in the dwell period at one or the other ends of its stroke and guide 28 will be positioned well out of the line of movement of the paddle 51 as it brings the slice to table 31 and returns for another slice.

During the period between the delivery of slices to the table 31 by the stacking means 52, the guide 28 will be reciprocated across the top of the most recently deposited slice to lay a portion of the divider material across the top of said slice. Crank 65 thus provides a simple means for obtaining a dwell of the guide at either end of its stroke, which dwell is necessary to permit the deposit of the next slice by the stacking means, and at the same time the crank produces a simple positive movement of the guide when the stacking means is clear of the path of movement of the guide.

To prevent any tearing of the paper, or other divider material, because of the sudden reciprocating movement of guide 28, a paper feed means, generally 74, cooperating with an idler 73, is provided to maintain a slack loop between the roll 75 of the divider material and the guide 28. The paper feed means 74 includes a power driven feed roll 76 about which the divider material is looped by being returned over an idler roll 77.

A chain 79 drives a sprocket 80 (connected to feed roll 76) from a sprocket 81 attached to power driven shaft 68, the ratio of sprocket 81 to sprocket 80 being such that for each half revolution of shaft 68, feed roll 76 will pay out the amount of divider material 22 required for guide 28 to make one pass across a slice 21 deposited upon the table 31. A holder 82 (Fig. 4) is used to receive the slack loop of divider material 22 and to prevent it from being disturbed by operations in or about the machine.

Table lowering mechanism

Table 31 is mounted from post 86 in such a manner that it may move vertically up and down. A bracket 87 connects the front end of the table with the frame to prevent any pivotal movement of table 31 about post 86. A half-nut 88 engages threads 89 on shaft 90 to control the vertical position of table 31. A toothed wheel 92 is attached to the lower end of shaft 90 and is adapted to be engaged by a pawl 93 pivotally secured to a rotatable arm 94. A connecting rod 95 between arm 94 and power driven crank 96 moves arm 94 and pawl 93 backward and forward in an arc with each rotation of the power driven crank 96.

The pawl 93 is resiliently urged toward the toothed wheel 92 so that with each counter-clockwise movement (as viewed in Fig. 8) of arm 94 the pawl will rotate the wheel 92 and shaft 90 through a given angle while with each clockwise movement of arm 94, pawl 93 will slide back over a given number of teeth of wheel 92. Adjusting arm 98 (Fig. 4) controls the angle through which pawl 93 moves shaft 90 with each rotation of crank 96, and thus controls the downward movement of table 31. Crank 96 is connected to the power source so that after each slice is deposited on table 31, the wheel 92 will be rotated and table 31 will be lowered by substantially the amount of the thickness of said slice.

To raise the table when the machine is stopped a finger grip 99 is pivoted towards hand grip 100, thus pulling half-nut 88 out of engagement with threads 89 and allowing the table to slide upwardly along post 86. Finger grip 99 is then released to allow half-nut 88 to again engage threads 89 and hold the table in a raised position. A handle 101 attached to the frame of table 31 facilitates the sliding of the table frame along the post 86.

Power shut-off mechanism

As previously explained, the disclosed embodiment is adapted for producing a package of eight slices making up a half-pound of cheese. Figs. 4 and 8 illustrate the switch mechanism, generally 104, to shut off or incapacitate the power supply after eight slices have been deposited upon the table. A ratchet wheel 105 is mounted on a shaft 106 suitably journaled in frame 107 of the switch mechanism 104. A cam 108 and a hand wheel 109 are also attached to shaft 106.

A spring finger 111 is attached to arm 94 in a position to engage one of the steps 112 of the ratchet wheel 105 with each clockwise movement of arm 94 and to drive the ratchet wheel one-eighth turn in a clockwise direction. Because of the spring action of finger 111 the finger will slip by the following step 112 of ratchet wheel 105 with the return, counter-clockwise, movement of arm 94. If desired, suitable friction means, or antiback-lash devices may be used to prevent any backward rotation of ratchet wheel 105 upon the return movement of finger 111. After eight steps of ratchet wheel 105, control finger 113 of a microswitch 114 drops into depression 115 in cam 108 to de-energize the power source or motor 116 by means of suitable electrical connections 117 to the motor.

Clamp and cut-off for divider material

Figs. 10, 11, and 12 illustrate the divider material clamp and cut-off mechanism, generally 32. This includes an arm 121 mounted on a shaft 122 suitably journaled in a bracket 123 attached to table 31. The portion of arm 121 facing guide 28 has a rubber pad 124 secured thereto. The opposite side of arm 121 has a blade 126 mounted thereon which blade cooperates with fixed blade 127 on table 31 to form a scissors for the cut-off of the divider material.

Shaft 122 attached to arm 121 extends beyond bracket 122 and has a compression spring 128 thereabout, which spring bears against the end face of bracket 123 and against a nut 129 secured to the end of shaft 122. The base portion of arm 121 forms a dog 131 which rides upon face 132 of bracket 123 when arm 121 approaches the horizontal position, but which slides off of face 132 as arm 121 approaches the vertical position due to the irregular shape of face 132. The dog 131 in cooperation with face 132 has a twofold action. First, it will hold the arm 121 in a vertical position after it has been raised to that position and, second, it will twist arm 121 toward fixed blade 127 on table 31 as the arm is lowered towards the table. This twisting action brings blades 126 and 127 into active contact with each other to provide a good cutting action on the strip of divider material.

Jogger

In some embodiments some difficulty may be encountered in obtaining a neat stack of slices on table 31. A tendency is for some of the slices to be thrown outwardly farther than others as a result of the rotational movement of paddle 51 coupled with the differences in the point of release of various slices from the paddle as it approaches the horizontal position. Several features of the present invention may be used to overcome this difficulty, either singly or in combination.

A stop 136 (Fig. 8) may be attached to table 31 in a fixed position and used to control the outward movement of the slices. However, more satisfactory results will be achieved if the stop 136 is reciprocated back and forth toward and away from the direction of entry of the slices into the space that they occupy over the table. In this way, the stop 136 acts as a jogger to continually line up the outer edges of the slices parallel to the face of the jogger.

A pair of slots 137 in the base of the movable stop or jogger fit loosely over the shank of a pair of stud bolts 138 secured into table 31. The fit of the sides of slots 137 about bolts 138, and between the heads of stud bolts 138 and the base of the movable stop 136 is relatively loose so that the stop 136 may be readily moved back and forth normal to the line of movement of the slices 21 as they are brought to table 31 by stacking means 52, with the face of stop 136 substantially parallel to the pivotal axis of paddle 51.

A right angle arm 139 is attached at one end to connecting rod 95 with the other end fitting loosely through an opening 140 in bracket 141 of jogger 136. As connecting rod 95 is reciprocated by the rotation of crank 96, the right angle arm 139 is likewise reciprocated, moving jogger 136 back and forth with respect to table 31. With each stroke of the jogger the outer edges of the slices 21 are contacted to continually even up the pile. The loose fit of arm 139 in hole 140 of bracket 141 allows the jogger to be operated despite the vertical movements of table 31.

A plurality of small pins 134 on the outer face of the fingers 53 of the lay-down paddle 51 will serve to hold the cheese slice in a given position with respect to the paddle until the paddle has all but reached its lower, horizontal position. The pins are extremely small and may be tapered so that the cheese slice 21 will readily fall away from the paddle at that time.

A rubber pad 135 on the upper face of table 31 will reduce the tendency of the bottom layer of divider material 22 to slide outwardly under the impact of the first slice of cheese deposited thereupon.

Power means

Fig. 9 illustrates in diagrammatic form the operating connection between the various parts of the device. A ring gear 143 is driven by a bevel gear 144 suitably connected to motor 116 as by means of a belt 145. A shaft 146 attached to ring gear 143 drives a crank 147, which crank moves the table 38 by means of a connecting rod 148. The movements of crank 147 and connecting rod 148 are transmitted by rods 149 and 150 to produce an intermittent rotary motion of shafts 151 and 152. The intermittent rotary motions of threaded shaft 152 provides the stepping action of pusher block 42.

Crank 48 that operates feed means 45 is pivotally connected at its lower end to the frame of the machine as illustrated both in Figs. 5 and 9. An intermediate point of the crank is connected to table 31 so that as the table reciprocates backwards and forwards on its ways, the upper end of crank 48 reciprocates to a considerably greater extent, thus moving the feed mechanism around in its track through the loose pin connection 153 between the upper end of crank 48 and feed means 45.

A second bevel gear 154 drives shaft 72 and gear 71, which provides the power for the interleaver as previously described in connection with Figs. 6 and 7. A sprocket 155 on shaft 72 is connected by a chain 156 to a sprocket 157 on the rotatable shaft carrying knife 41 to impart the desired rotary motion to the knife.

A third bevel gear 159 is driven by ring gear 143 to rotate a countershaft 160 through gears 161 and 162. Countershaft 160 drives crank 96 through a pair of meshing bevel gears 163 and 164.

Countershaft 160 also rotates a cam 166, the follower (167) of which controls the movement of paddle 51 of stacking means 52. As the high side of the cam 166 pushes the follower to the left the paddle 151 is rotated in a clockwise direction to the vertical position and extends spring 168. As the low side of cam 166 approaches follower 167, the follower releases paddle 51 to be returned to the horizontal position by the action of spring 168.

Operation

The operation of the apparatus is extremely simple. A block of cheese is placed upon table 38 with pusher 42 in engagement with the rear end of the block of cheese. Table 31 is in a raised position. The divider material projects from the lower end of guide 28, overlies the top of table 31 and is held under the rubber pad attached to clamp 32. The motor 116 of the slicer is energized. Table 38 reciprocates rearwardly to remove the end of the block impaled upon pins 44 of feed mechanism 45. The slice 21 is transferred by the feed mechanism 45 to the stacking means 52, during which time the guide has moved to the rearward end of its stroke, and stacking means 52 deposits the slice on top of the portion of divider strip 22 overlying table 31. The guide means of the interleaver is then moved forwardly to deposit a strip of divider material across the top of that slice and remains in the forward position while the next slice of cheese is deposited on the table.

After eight slices have been deposited on the table, switch mechanism 104 stops the machine. The operator raises clamp 32, pulls the stack of eight slices toward him, and deposits it on the forward portion 175 of table 41. The operator then releases the engagement of the half-nut 88 with threads 89 of the table-lowering shaft, and raises the table to its original position by means of handle 101 in which position the half-nut is again placed into engagement with threads 89. The clamp 32 is lowered, cutting off the strip of divider material and fastening the end of it in place for producing a new stack of cheese slices.

The machine is restarted and while it is producing the next eight slices, the first stack, which has been set on the front portion 175 of table 31 is either placed in a suitable container by the operator or transferred to a wrapping station where it may be sealed in an outer wrapper 23.

We claim:

1. The method of preparing a food product for handling and subsequent use which includes the steps of sequentially cutting a slice from a block thereof, moving said slice along a given line to a predetermined point, laying a portion of a continuous strip of a divider material across one side of said slice by a movement of said portion in a path transverse to said line, cutting a second slice from said block, moving a second slice along said line to said point, placing said second slice with one side thereof against said portion, and bringing said strip about one edge of said second slice and across the other side of said second slice by a movement of said strip along said path.

2. The method of preparing a food product for handling and subsequent use which includes the steps of sequentially cutting a slice from a block thereof, moving said slice along a given line to a predetermined point, laying a portion of a continuous strip of a divider material across one side of said slice by a movement of said portion in a path transverse to said line, cutting a second slice from said block, moving said second slice along said line to said point, placing said second slice with one side thereof against said portion, laying a second portion of said strip across said second slice by a movement in said path, repeating said steps to form a bundle of a plurality of slices of cheese through which said strip is woven, and placing said bundle in an outer wrapper.

3. The method of winding a continuous strip of flexible material through a number of slabs of food product which includes the steps of moving a slab along a given line to a predetermined point, depositing said slab on its side over said point, laying a portion of said strip across the said slab by a movement of said portion in a path at right angles to said line from beyond one edge of said slab to beyond the opposite edge of said slab, moving a second slab along said line to said point, depositing said second slab on its side over said first slab and said strip, and laying a second portion of said strip across said second slab by a movement of said second portion in said path from beyond said opposite edge to beyond said one edge of said second slab.

4. The method of winding a continuous strip of flexible material through a number of slabs of food product which includes the steps of moving a slab along a given line with one edge forward to a predetermined point, depositing said slab on its side over said point, aligning the forward moving edge of the deposited slab to a given plane, laying a portion of said strip across the said slab by a movement of said portion in a path at right angles to said line from beyond one edge of said slab to beyond the opposite edge of said slab, moving a second slab along said line with one edge forward to said point, depositing said second slab on its side over said first slab and said strip, aligning the forward moving edge of said second slab to said plane, and laying a second portion of said strip across said second slab by a movement of said second portion in said path from beyond said opposite edge to beyond said one edge of said second slab.

5. The method of preparing a food product for handling and subsequent use which includes the steps of dividing a block thereof into a plurality of slabs, sequentially moving said slabs along a predetermined line to a given point, and drawing a portion of a continuous strip of divider material across a side of each slab after it is moved to said point and before the movement of the next slab to said point by a movement of said portion in a path transverse to said line from beyond one edge of said slab to beyond an opposite edge of said slab.

6. The method of preparing a food product for packaging which includes the steps of dividing a block thereof into a plurality of slabs, moving one of said slabs along a predetermined line to a given point, depositing said one of said slabs on its side over said given point, drawing a portion of a continuous strip of divider material across the upper side of said slab by a movement of said portion in a path transverse to said line from beyond one edge of said slab to beyond the opposite edge of said slab, repeating said steps to build up a stack of a given number of slabs with a portion of said strip therebetween, removing said stack from over said point, and severing said material adjacent said stack.

7. A device for winding a continuous strip of flexible material between the individual slices sequentially cut from a block, said device including a slicing means for cutting a series of slices from said block, stacking means movable along a given line to place each of said slices in side by side relationship, and an interleaver movable along a path normal to said line to place a portion of said continuous strip between the adjacent sides of the slices in timed relation to the placement of each of the slices by said stacking means.

8. A device for winding a continuous strip of flexible material between a plurality of slabs, said device including a table, a lay-down paddle movable to deposit each of the slabs on its side at a given point over said table, feed means to supply slabs to said paddle in sequential order in timed relation to the movement of said paddle, and an interleaver to lay a portion of said strip across the top of each of the deposited slabs in timed relationship to the movement of said paddle, said interleaver having arm means movable in a given path across said point and forming a guide for the feeding of said strip, the path of movement of said arm means being substantially normal to the path of movement of the paddle.

9. A device for winding a continuous strip of flexible material between a plurality of slabs, said device including a lay-down paddle pivotally mounted to turn about on an axis from a vertical to a horizontal position, a table positioned under said paddle when the latter is in a horizontal position, feed means to supply slabs to said paddle in sequential order and to position said slabs in front of said paddle when the latter is in the vertical position whereby the paddle may be pivoted to deposit the slabs at a point on the table, an interleaver to lay a portion of said strip across the top of each of said slabs after it is deposited on the table, said interleaver having arm means movable over said point along a path parallel to said axis, said arm means forming a guide for said strip, and power means to move said feed means, said paddle, and said arm means in timed relationship.

10. A device for winding a continuous strip of flexible material between a plurality of slabs, said device including a lay-down paddle pivotally mounted to turn about on an axis from a vertical to a horizontal position, a table positioned under said paddle when the latter is in a horizontal position, feed means to supply slabs to said paddle in sequential order and to position said slabs in front of said paddle when the latter is in the vertical position whereby the paddle may be pivoted to deposit the slices at a point on the table, an interleaver to lay a portion of said strip across the top of each of said slabs after it is deposited on the table, said interleaver having arm means movable over said point along a path parallel to said axis, said arm means forming a guide for said strip, and a jogger having a face parallel to said axis and movable along a line intersecting said point, which line is normal to said axis, to even the edges of the slabs parallel to said face, and power means to move said feed means, said paddle, said jogger, and said arm means in timed relationship.

11. A device for winding a continuous strip of flexible material between a plurality of slabs, said device including a table, stacking means to intermittently move a slab along a line to a point over said table and to then deposit said slab in a predetermined position, and an interleaver to lay a portion of said strip across the top of each of said slabs after it is deposited on the table, said interleaver having arm means movable over said point along a path normal to said line, said arm means forming a guide for said strip through which the strip may be deposited as the arm means moves across the slabs.

12. A device for winding a continuous strip of flexible material between a plurality of slabs, said device including a table, stacking means to intermittently move a slab along a line to a point over said table and to then deposit said slab in a predetermined position, power means to move said stacking means in a generally horizontal direction along said line to said point and to retract said stacking means to a position to one side of said point, said interleaver having arm means movable over said point along a path normal to said line, said arm means forming a strip guide the bottom end of which is spaced from the top of said table and which extends in a generally vertical direction above said table a sufficient distance to clear said stacking means as the latter moves over the point, said arm means being connected to said power means to move said guide means across said point when said stacking means is retracted from over said point, said movement being from beyond one side of said point to beyond the other side of said point.

13. A device for winding a continuous strip of flexible material between a plurality of slabs, said device including a table, movable in a vertical direction, stacking means to intermittently move a slab along a line to a point over said table and to then deposit said slab in a predetermined position, an interleaver to lay a portion of said strip across the top of each of said slabs after it is deposited on the table, said interleaver having arm means movable over said point along a path normal to said line, said arm means forming a guide for said strip through which the strip may be deposited as the arm means moves across the slabs, and means to lower said table a distance equal to the thickness of the slabs in timed relationship to the movements of the stacking means and the arm means.

14. An interleaver for use with a slicing machine having a stacking means to intermittently deposit a slice at a point on a table by moving each slice along a line to said point, said interleaver including arm means movable along a path normal to said line, said arm means forming a guide for a continuous strip of paper or the like, said guide being movable back and forth over said point by said arm means, said arm means being operatively connected to said slicing machine whereby the guide will be moved over said point after a slice is deposited by said stacking means.

15. An interleaver for use with a slicing machine having a stacking means to intermittently deposit a slice at a point on a table by moving each slice along a line to said point, said interleaver including arm means movable along a path normal to said line, said arm means forming a guide for a continuous strip of paper or the like, said guide being movable back and forth over said point by said arm means, said arm means being operatively connected to said slicing machine whereby the guide will be moved over said point after a slice is deposited by said stacking means, and feed means to deliver said strip to said guide as said arm means moves back and forth over said point to deposit a portion of said strip over the slices placed on said table.

16. A device for winding a continuous strip of flexible material between a plurality of slabs, said device including a stacking means having a slab engaging head, said head being pivotally mounted to turn about an axis from a first position at which said head engages a slab, to a second position at which said head releases said slab, said head being generally vertical when in said first position, and generally horizontal when in said second position, feed means to supply said slabs to said head and to position said slabs generally vertical in front of said head when the latter is in the vertical position, an interleaver to lay a portion of said strip across the top of each of said slabs after it has been moved by said head to said second position, said interleaver having arm means movable along a path parallel to said axis, said arm means forming a guide for said strip, and power means to move said feed means, said stacking means, and said arm means in timed relationship.

BERNARD T. HENSGEN.
JOHAN C. VANDEN BOSCH.

References Cited in the file of this patent

UNITED STATES PATENTS

| Number | Name | Date |
|---|---|---|
| 554,020 | Dehaitre | Feb. 4, 1896 |
| 2,201,872 | Rottenberg | May 21, 1940 |
| 2,228,492 | Wetherbee | Jan. 14, 1941 |
| 2,232,420 | Witt et al. | Feb. 18, 1941 |
| 2,246,016 | Sinclair | June 17, 1941 |
| 2,383,352 | Snyder | Aug. 21, 1945 |
| 2,441,757 | Doering et al. | May 18, 1948 |

FOREIGN PATENTS

| Number | Country | Date |
|---|---|---|
| 1,909 | Great Britain | 1865 |
| 23,203 | Great Britain | 1893 |
| 458,156 | France | Oct. 4, 1913 |